United States Patent [19]
DiTucci

[11] Patent Number: 5,367,234
[45] Date of Patent: Nov. 22, 1994

[54] CONTROL SYSTEM FOR SENSORLESS BRUSHLESS DC MOTOR

[76] Inventor: Joseph DiTucci, 16 August Rd., Simsbury, Conn. 06070

[21] Appl. No.: 112,036

[22] Filed: Aug. 26, 1993

[51] Int. Cl.$^5$ ............................................. H02P 5/06
[52] U.S. Cl. .................................... 318/254; 318/138; 318/439
[58] Field of Search ............... 318/254, 138, 439, 685, 318/696

[56] References Cited

U.S. PATENT DOCUMENTS

| | | | |
|---|---|---|---|
| 4,136,308 | 1/1979 | King | 318/696 |
| 4,262,236 | 4/1981 | Gelenius | 318/254 X |
| 4,262,237 | 4/1981 | Gelenius | 318/254 |
| 4,446,406 | 5/1984 | Uzuka | 318/254 |
| 4,459,519 | 7/1984 | Erdman | 318/254 |
| 4,491,772 | 1/1985 | Bitting | 318/254 |
| 4,494,054 | 1/1985 | Pelligrini | 318/254 |
| 4,651,067 | 3/1987 | Ito et al. | 318/254 |
| 4,651,069 | 3/1987 | Pelligrini | 318/254 |
| 4,678,973 | 7/1987 | Elliott et al. | 318/254 |
| 4,694,210 | 9/1987 | Elliott et al. | 310/68 R |
| 4,743,815 | 5/1988 | Gee et al. | 318/254 |
| 4,857,814 | 8/1989 | Duncan | 318/254 X |
| 4,928,043 | 5/1990 | Plunkett | 318/254 |
| 4,970,445 | 11/1990 | Kimura et al. | 318/254 |
| 5,187,419 | 2/1993 | DeLange | 318/254 X |
| 5,202,614 | 4/1993 | Peters et al. | 318/254 |
| 5,221,881 | 6/1993 | Cameron | 318/254 |
| 5,245,256 | 9/1993 | Cassat et al. | 318/254 |

OTHER PUBLICATIONS

B. C. Kuo & K. Butts, "Closed-Loop Control of a 3.6° Floppy-Disk Drive PM Motor by Back-EMF Sensing", Proceedings, Eleventh Annual Symposium on Incremental Motion Control Systems and Devices, May, 1982.
SRL Inc. Quarterly Report, "Research on the PDM 253/25 Step Motor" Mar., 1980.
W. C. Lin, B. C. Kuo & U. Goerke, "Waveform Detection of Permanent-Magnet Step Motors", Parts I & II, Proceedings of Eighth Annual Symposium on IMCSD Mar. 1979, pp. 227-256.

Primary Examiner—William M. Shoop, Jr.
Assistant Examiner—David Martin

[57] ABSTRACT

Control circuitry for a brushless direct current motor is premised on constructing phase to phase back emf signals representing the differences between the back electromotive force efforts produced in each phase winding of the motor. The phase to phase back emf signals are used to produce logic level signals having logic level changes at the zero voltage crossover points of the phase to phase back emf signals. Detection of the zero voltage crossover points is dictated by selectively activated comparator circuits. A method is also disclosed as to how the values of certain circuit elements may be derived.

14 Claims, 5 Drawing Sheets

CONTROL SYSTEM FOR SENSORLESS BRUSHLESS DC MOTOR

FIELD OF INVENTION

This invention relates to the controlled application of drive voltage to a brushless direct current motor and in particular to the controlled application of drive voltage to a sensorless brushless direct current motor.

Brushless direct current motors are well known in the art. The phase windings in these motors are sequentially energized at appropriate times so as to produce a rotating magnetic field relative to a permanent magnet rotor. The timing of such energization is a function of where the permanent magnetic rotor is relative to a phase winding that is to be energized. Various means have been heretofore used to sense the position of the permanent magnet rotor relative to the phase windings. These have included optical sensors and Hall effect devices which feed a position signal to switching logic that selectively switches power on and off to the respective phase windings. These sensing devices add cost to a system and may moreover require expensive hermetically sealed connecting leads. These devices and associated connecting leads can also require maintenance from time to time to assure continued proper operation. As a result of these drawbacks, attention has recently been focused on "sensorless" systems which are not premised on any direct sensing of the rotor position itself. These systems generally attempt to measure the effect of the back electromotive forces produced in the energized windings by a rotating rotor. These systems have achieved various degrees of success in accurately measuring the effect of this back electromotive force.

OBJECTS OF THE INVENTION

It is an object of the invention to provide an improved system for accurately sensing the back electromotive force (emf) voltage in a brushless direct current motor.

It is another object of the invention to provide a controlled drive system for a brushless direct current motor that is premised on an accurate sensing of the back electromotive force voltage in the motor.

SUMMARY OF THE INVENTION

The above and other objects are achieved by providing a controlled drive system for a brushless direct current motor which is premised on constructing phase to phase back emf signals representing the differences between the back electromotive force effects produced in each phase winding of the motor. These signals are constructed by individual circuits, each of which receives the voltages from two successive phase windings. These voltages are attenuated and adjusted so as to take into account the impedance effects produced by the particular phase windings. The adjustment for impedance effects includes a pair of resistance and capacitance configurations having current source circuitry associated therewith. The thus adjusted voltages in each individual circuit are applied to a differential amplifier which produces the phase to phase back emf signals between the two successive windings. The resulting phase to phase back emf signals are used to produce binary signals having logic level changes at zero crossover points in the phase to phase back emf signals. The logic level changes are preferably generated by comparator circuits which are selectively activated when zero crossover is anticipated. The resulting logic level signals are used to define well known switching signals that control when each phase winding is to be selectively energized.

BRIEF DESCRIPTION OF THE DRAWINGS

Other objects and advantages of the present invention will be apparent from the following description in conjunction with the accompanying drawings in which.

DESCRIPTION OF THE PREFERRED EMBODIMENT

Figure 1:
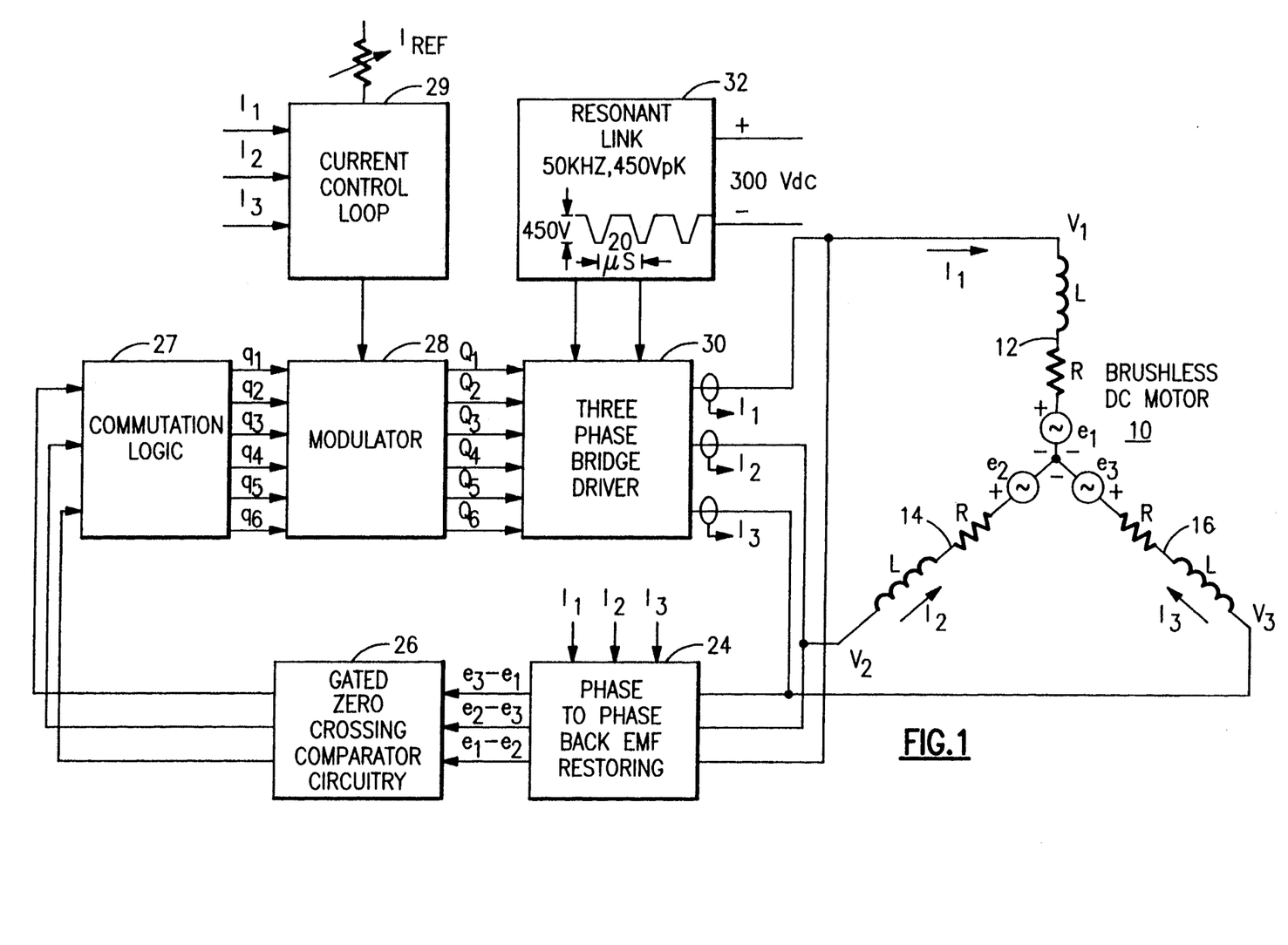
FIG. 1 illustrates the controlled drive system for the phase windings of a three phase brushless direct current motor.

Referring to FIG. 1, a schematic representation of a brushless direct current motor 10 is seen to include phase windings 12, 14 and 16 each having an inductance value L associated therewith. The impedance of each phase winding also includes a resistance component having a resistance value of R. Each phase winding 12, 14 and 16 will experience a back emf voltage denoted as $e_1$, $e_2$, or $e_3$ in the energized phase windings produced by the rotation of a permanent magnetic rotor (not shown). The energization of the phase windings is accomplished by timed application of the phase voltages $V_1$, $V_2$, $V_3$ causing phase currents $I_1$, $I_2$, $I_3$ to flow in the respective phase windings.

The phase voltages $V_1$, $V_2$, and $V_3$ as well as the phase currents $I_1$, $I_2$, and $I_3$ are applied to a phase to phase back emf restoring circuit 24. The restoring circuit is operative to produce gain adjusted phase to phase back emf voltages $e_1-e_2$, $e_2-e_3$, and $e_3-e_1$. These signals are further processed by gated zero crossing comparator circuitry 26 which compares the phase to phase back emf voltage levels to ground just prior to zero crossover. Logic level signals equivalent to that obtained from Hall effect sensing devices are generated by the gated zero crossing comparator circuitry 26. These signals are applied to commutation logic 27 which produces commutation logic level signals $q_1$, $q_2$, $q_3$, $q_4$, $q_5$, and $q_6$.

The commutation logic level signals $q_1$ through $q_6$ are applied to a modulator 28 which also receives a current loop error signal from current control loop 29. It is to be appreciated that the commutation logic 27, the modulator 28 and the current control loop 29 are well known in the art. This circuitry is operative to produce the switching signals $Q_1$ through $Q_6$ which are applied to a three phase bridge driver circuit 30. The bridge driver circuit in combination with a power supply source 32 selectively applies the voltages $V_1$, $V_2$, and $V_3$ to the phase windings 12, 14 and 16. The selective application is dictated by power semiconductor switches responsive to the switching signals $Q_1$ through $Q_6$ in a manner well known in the art. The power supply associated with the three phase bridge driver is preferably a resonant link bus providing a fifty kilohertz signal of 450 peak volts sustainable for twenty microseconds. It is to be appreciated that the invention is equally applicable to a driver using a direct current bus and pulse width modulation (PWM) control.

Top switches in the three phase bridge drive circuit 30 connect the resonant link bus 32 to the respective phase windings of the motor 10. Bottom switches associated with each winding connect respective windings back to the resonant link return bus 32. The modulator 28 produces the top switch signals $Q_1$, $Q_2$, and $Q_3$ for the respective top switches directly from the commutation logic level signals $q_1$, $q_2$ and $q_3$. The commutation logic 27 in combination with the modulator 28 and the current control loop 29 produces the signals $Q_4$, $Q_5$, and $Q_6$ for the bottom switches. The drive signal to the three bottom switches is modulated by the current control loop error signal in order to maintain a defined current in the brushless dc motor phase windings. Logic level changes in the $q_1$ through $q_6$ signals occur at the zero crossover points of phase to phase back emf voltages generated by the phase to phase back emf voltage restoring circuit which will be hereinafter described in detail.

Figure 2:
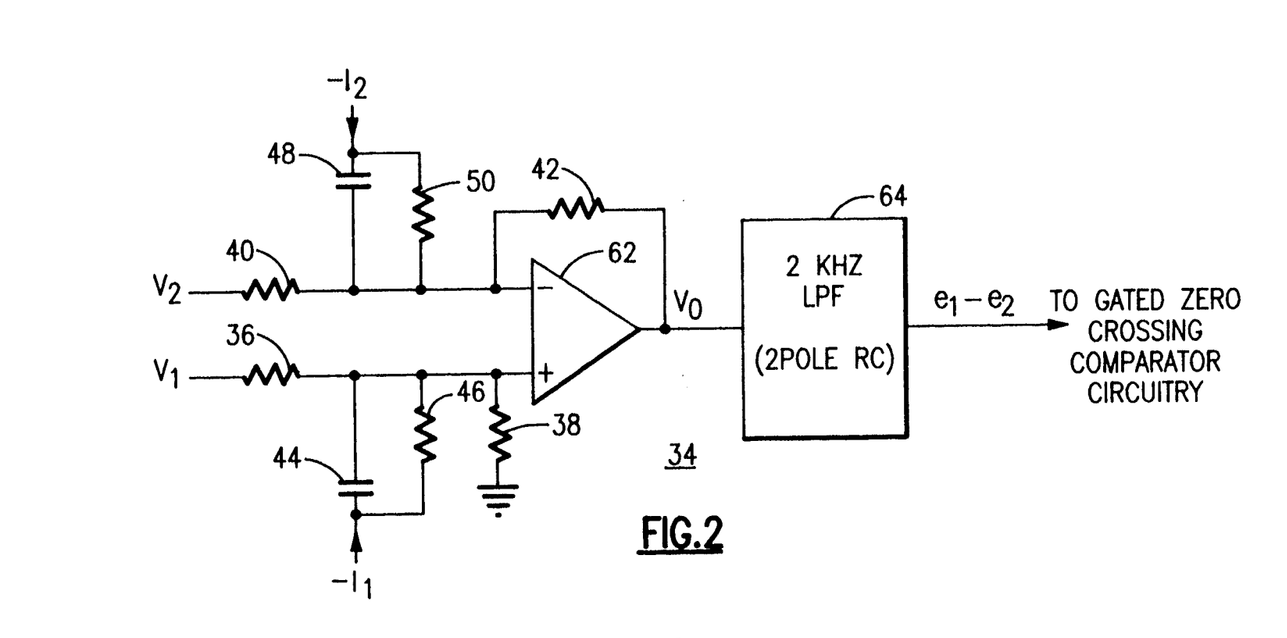
FIG. 2 illustrates one of three separate circuits which restore the phase to phase back electromotive force voltage of the three phase brushless direct current motor.

Referring to FIG. 2, a circuit 34 within the phase to phase back emf restoring voltage circuit 24 is illustrated in detail. The circuit 34 produces an output voltage equivalent to the difference between the back emf voltages $e_1$ and $e_2$. It is to be understood that there are two additional circuits not shown which produce output voltages equivalent to $e_2-e_3$ and $e_3-e_1$. The circuit 34 includes resistors 36, 38, 40, and 42 which preferably perform a fifty to one voltage attenuation of the voltages $V_1$ and $V_2$. The voltages $V_1$ and $V_2$ are the high voltage levels from the resonant link bus applied to the windings 12 and 14 respectively. The resulting attenuated voltages are furthermore each adjusted by RC configurations comprising capacitor 44 and resistor 46 for voltage $V_1$ and capacitor 48 and resistor 50 for voltage $V_2$. The current drawn through each RC configuration is governed by a respective current source circuit. An example of a current source circuit is shown in FIG. 3.

Figure 3:
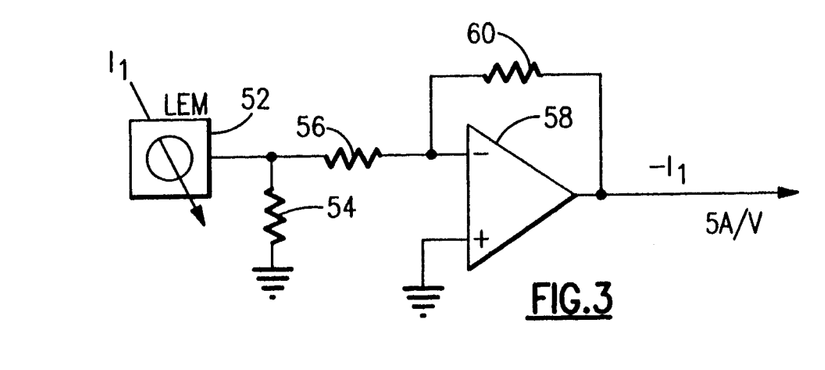
FIG. 3 illustrates one of two motor phase current source circuits that operate with the circuit of FIG. 2.

Referring to FIG. 3, an LEM current sensor 52 develops a signal voltage across a resistor 54 which is proportional to the measured phase current, $I_1$. This signal voltage is applied through a resistance 56 to an operational amplifier 58 having feed back resistance 60. The resulting inverted phase current signal, $-I_1$, preferably generates a voltage based on a ratio of amps of the current, $I_1$, per volt to be experienced by the corresponding RC configuration of capacitor 44 and resistor 46. It is to be appreciated that the current signal produced by the circuitry of FIG. 3 could be done by alternative circuitry not necessarily using a LEM sensor. It is furthermore to be appreciated that a similar current source circuit produces a similar current effect of five amperes per volt for the current $I_2$. This inverted current signal, $-I_2$, is experienced by the RC configuration comprising the capacitor 48 and resistor 50.

As will be explained in detail hereinafter, each current source circuit works with its respective RC configuration in the circuit 34 to cancel or subtract out the signal component of the corresponding attenuated voltage of either $V_1$ or $V_2$ caused by the inductance and resistance of the phase winding for the particular $V_1$ or $V_2$ voltage.

The thus adjusted voltages downstream of the respective RC configurations are applied to a differential amplifier 62 in FIG. 2 having the feed back resistance 42 and the ground reference resistance 38. As will be explained in detail hereinafter, the output of the differential amplifier configuration will be equivalent to the phase to phase difference in the back emf voltages $e_1$ and $e_2$ in the brushless d.c. motor 10 with the exception of a fifty kilohertz noise component and a noise spike coincident with communication switching. Both of these noise components are minimal with ideal cancellation (null balance) of the signal components in $V_1$ and $V_2$ caused by the inductance and resistance of the respective phase winding. They increase in amplitude with deviation from null balance which is caused by changes in motor phase winding parameters. A two pole RC low pass filter 64 having a band pass of two kilohertz attenuates these noise components. These components are further filtered out by the zero crossing comparator circuitry of FIG. 5 in a manner which will be addressed hereinafter.

As has been previously noted, the output of the differential amplifier 62 will be equivalent to the phase to phase difference in the back emf voltages $e_1$ and $e_2$. This is accomplished by configuring the circuits of FIGS. 2 and 3 in a manner which will now be described. As has been previously noted, current source circuits such as the circuit of FIG. 3 produce a given ratio of voltage to be experienced by an associated RC configuration per amperes of current in the phase windings. This ratio is preferably five amperes of phase winding current per volt to be experienced by an RC configuration. This given ratio allows the values of capacitance and resistance for each RC configuration in FIG. 2 to be accurately calculated as will now be described. Referring to FIG. 2, the capacitors 44 and 48 are to have a capacitance value of "C" and the resistors 46 and 50 are to have resistance values of $R_3$. The input resistors 36 and 40 are to have resistance values of $R_1$ and the resistors 38 and 42 are to have resistance values of $R_2$. Based on the above assigned variables, the following equation can be derived for the output voltage, $V_o$, of the differential amplifier 62 in FIG. 2:

$$V_o = \frac{R_2}{R_1}(V_1 - V_2) - R_2 C \frac{d(I_1 - I_2)}{dt} - \frac{R_2}{R_3}(I_1 - I_2)$$

The following equation can also be written for the difference between the voltages $V_1$ and $V_2$ as a function of currents $I_1$, $I_2$ and the phase winding inductances L and resistances R in the schematic representation of the brushless d.c. motor 10 of FIG. 1:

$$V_1 - V_2 = L\frac{dI_1}{dt} + RI_1 + e_1 - e_2 - RI_2 - L\frac{dI_2}{dt}$$

This equation can be rewritten as follows:

$$e_1 - e_2 = (V_1 - V_2) - L\left(\frac{dI_1}{dt} - \frac{dI_2}{dt}\right) - R(I_1 - I_2)$$

By setting $V_o = e_1 - e_2$ and noting the following values, one can solve for C and $R_3$:

500 volts at the motor = 10V in circuit 34
50 A at the motor = 10V at circuit 34
L = 3.1 mH
R = 0.34 ohms
$R_1$ = 150 Kilo ohms
$R_2$ = 3 Kilo ohms The above defines a voltage power to signal ratio of fifty (500V/10V) and a current power to signal ratio of five (50A/10V). It follows that:

$$\frac{L}{10} = R_2 C$$

$$C = \frac{L}{10 R_2} = \frac{3.1 \times 10^3}{10(3 \times 10^3)} = .1033 \times 10^{-6} = .1033 \ \mu F$$

$$\frac{R}{10} = \frac{R_2}{R_3}$$

$$R_3 = \frac{10 R_2}{R} = \frac{(10)(3 \times 10^3)}{.34} = 88,235 \text{ ohms}$$

It is hence to be appreciated that the circuit 34 of FIG. 2 can be precisely configured to produce the phase to phase emf signal for $e_1-e_2$.

Figure 4:
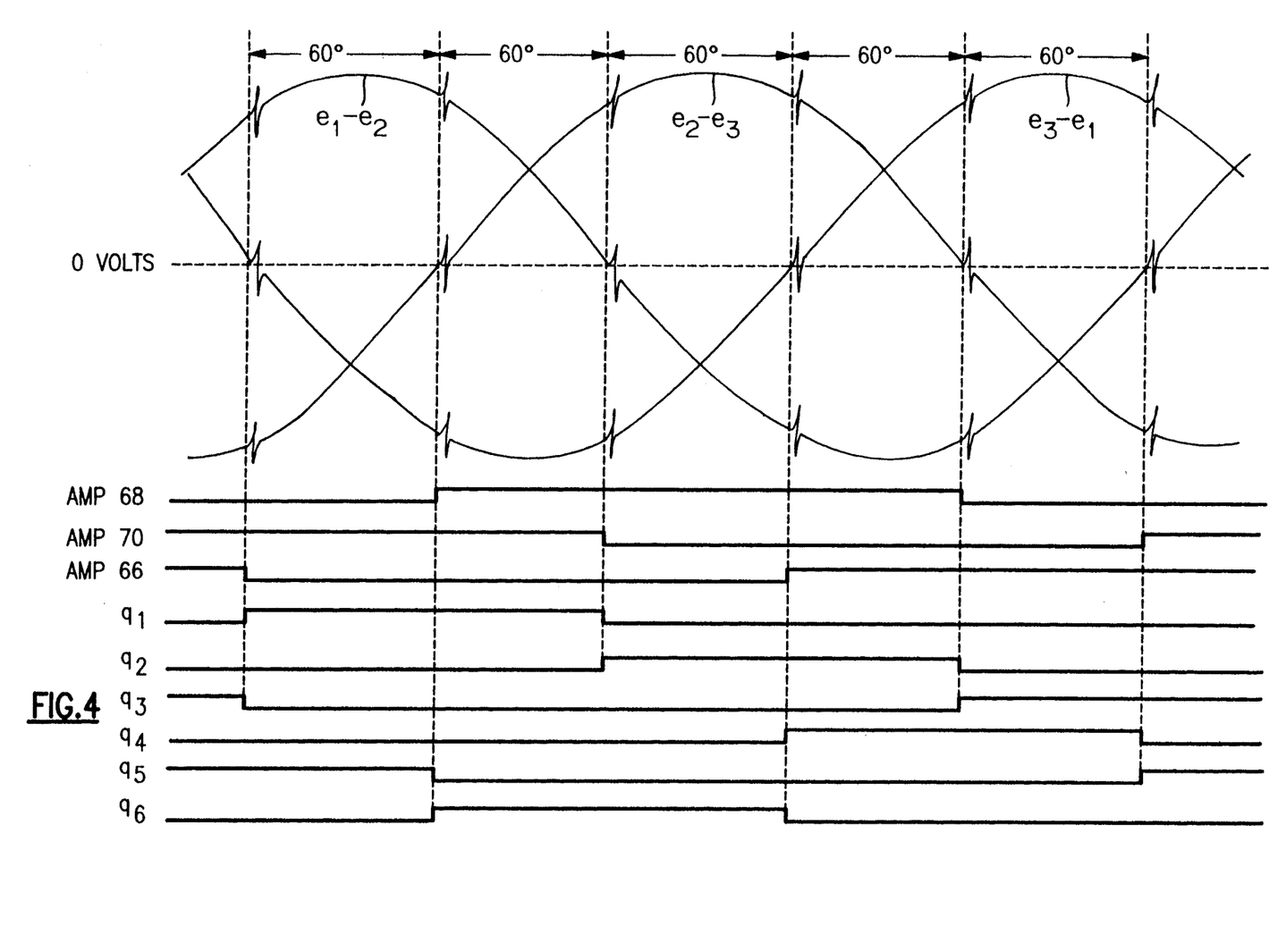
FIG. 4 illustrates the phase to phase signals produced by all circuits associated with the phase windings.

It is to be appreciated that two similar circuits with associated current source circuits generate the phase to phase back emf signals of $e_2-e_3$ and $e_3-e_1$. These circuits are all within the overall phase to phase back emf restoring circuit 24. The resulting periodic signals are illustrated in FIG. 4. It is to be noted that these signals have several undesirable spikes attributable to commutation switching. These signals are applied to the gated zero crossing comparator circuitry 26 which detects the zero crossing points of each signal having the undesirable spikes.

Figure 5:
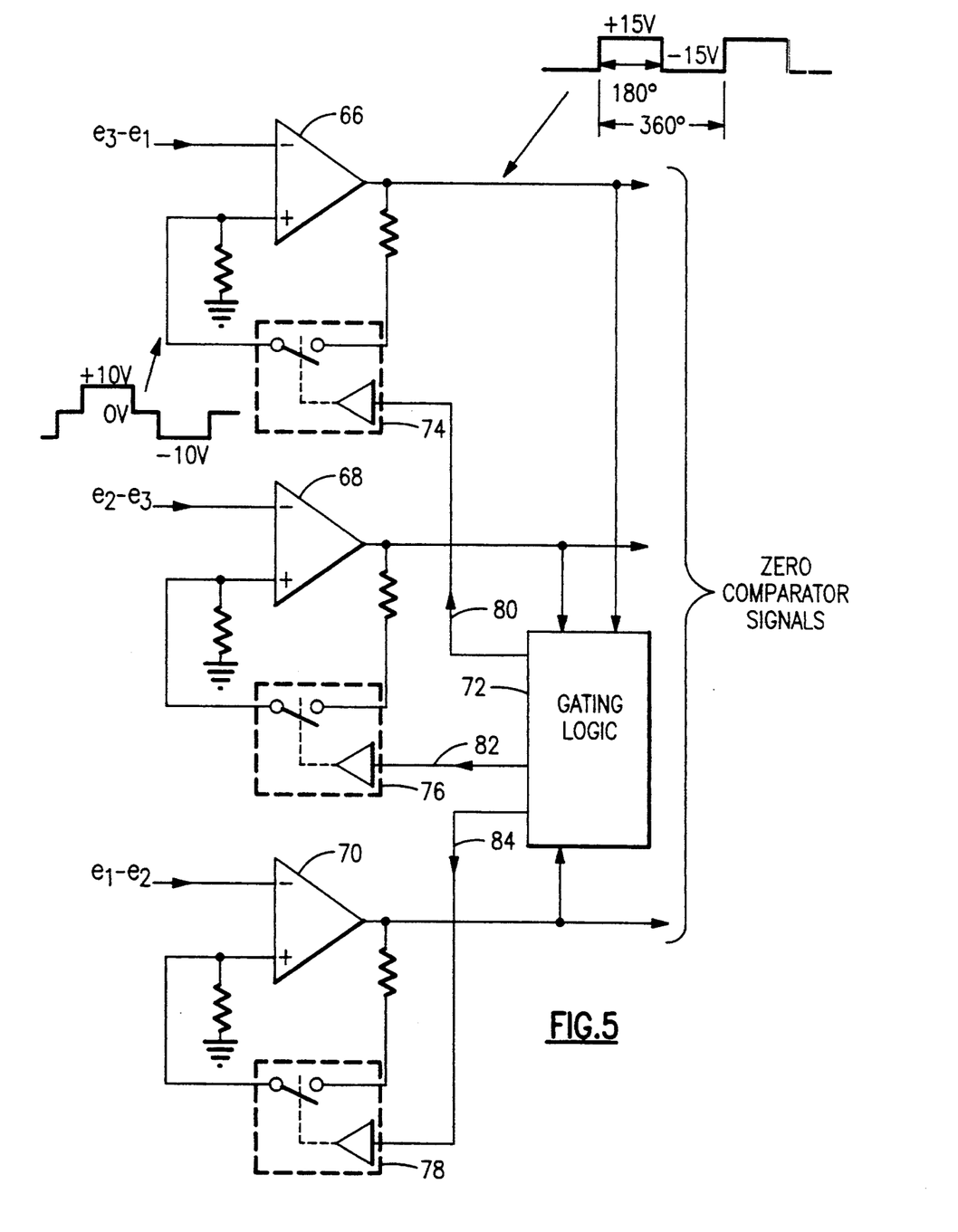
FIG. 5 illustrates zero crossing comparator circuitry which further processes the phase to phase signals produced by the circuits associated with the phase windings.

Referring to FIG. 5, the gated zero crossing comparator circuitry 26 is illustrated in detail. This circuitry is seen to include a bank of gated comparative amplifiers 66, 68, and 70 having feedback loops which are selectively disabled by gating logic 72 in association with switching configurations 74, 76, and 78. The feedback loop of each operational amplifier is disabled prior to the zero cross over of the respective phase to phase back emf signal applied to the amplifier and again enabled after crossover. Disablement of the feedback loop for the comparative amplifier 66 occurs when the switch in the switching configuration 74 is opened. This produces a zero voltage condition at the positive input of this comparative amplifier 66. Enablement of the feedback loop occurs when the switch in the switching configuration is closed. The resistance in the feedback loop attenuates the plus or minus output of the amplifier 66 so as to produce plus or minus ten volts at its plus input. These voltage levels are greater than the $e_3-e_1$ signal level and hence prevent a change in the comparative decision.

Figure 6:
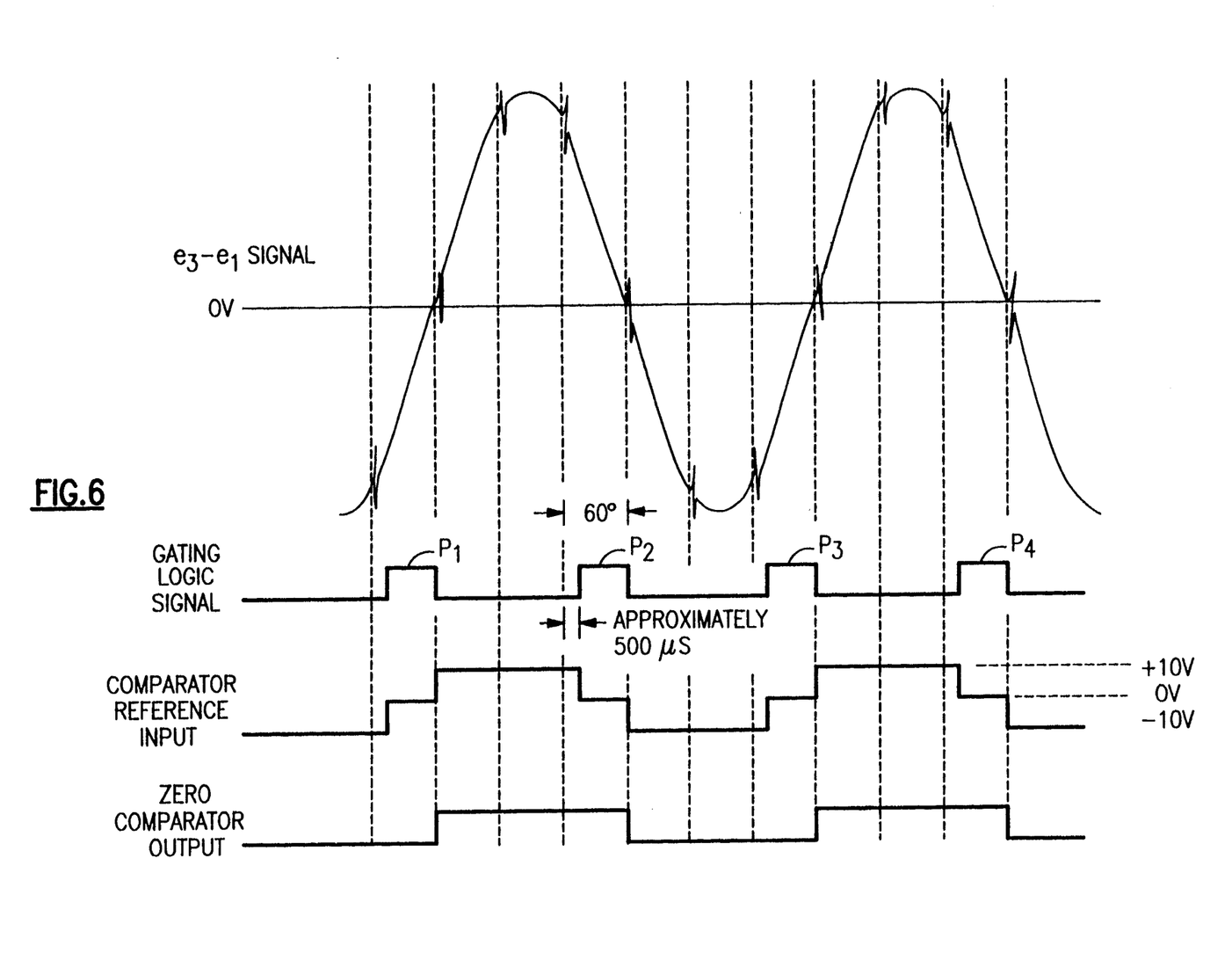
FIG. 6 illustrates the signal processing by the circuitry of FIG. 5.

Referring to FIG. 6, the phase to phase back emf signal of $e_3-e_1$ that is to be sampled for zero crossover is illustrated. This signal includes the undesirable spikes which are attributable to commutation switching. The gating signal for the switching configuration 74 associated with the operational amplifier 66 is also illustrated in FIG. 6. The gating logic signal produces gating pulses $P_1$, $P_2$, $P_3$, and $P_4$ immediately prior to zero crossover of the phase to phase back emf signal. The pulse width is preferably sixty degrees minus a five hundred microsecond period of time. As a result of these pulses, the operational amplifier 66 receives a comparator reference input signal as shown in FIG. 6 which is zero volts only during the window periods defined by the pulses and is otherwise minus ten volts during the negative voltage periods of $e_3-e_1$ and plus ten volts during the positive voltage periods of this signal. These reference voltage levels cause the operational amplifier 66 to not respond to any non zero voltage level in the $e_3-e_1$ signal including the denoted voltage spikes. As a result, the operational amplifier 66 produces the zero comparator output signal illustrated in FIG. 6. This signal is seen to be applied to the gating logic 72 which consists of appropriate AND and OR gates and inverters that monitor the comparator output signals of the amplifiers 66, 68 and 70. These logic elements develop sixty degree width pulses. Zero crossover decisions from the amplifiers 66, 68 and 70 also preferably trigger a multivibrator within the gating logic which develops logic pulses of five hundred microseconds. These latter pulses are used to shorten the period of each sixty degree pulse at its start. The resulting gating logic pulses such as $P_1$, $P_2$, $P_3$, and $P_4$ for the feedback circuit 74 are generated on the output line 80 in FIG. 5. Similar gating logic pulses would be produced on output lines 82 and 84 for the feedback circuits 76 and 78.

Referring again to FIG. 4, the zero comparator signal out of comparative amplifier 66 is seen to have leading and trailing edges defining zero voltage crossover points of the phase to phase back emf signal $e_3-e_1$. It is to be noted that similar zero comparator signals are produced by the operational amplifiers 68 and 70 for the zero crossover points of the phase to phase back emf signals $e_2-e_3$ and $e_1-e_2$. These signals are illustrated relative to the corresponding phase to phase back emf signals in FIG. 4.

The zero comparator signals are applied to the commutation logic 27 which produces the switching logic signals $q_1$ through $q_6$ As can be seen in FIG. 4, the switching signals $q_1$ and $q_4$ are responsive to the zero comparator signal from the operational amplifier 66 whereas $q_2$ and $q_5$ are responsive to the zero comparator signal from the operational amplifier 70 and the switching signals $q_3$ and $q_6$ are responsive to the zero comparator signal from the operational amplifier 68. As has been previously discussed with regard to FIG. 1, the commutation logic signals $q_1$ through $q_6$ are applied to modulator 28. The modulator 28 produces the top switching signals $Q_1$, $Q_2$ and $Q_3$ directly from the signals $q_1$, $q_2$ and $q_3$. The commutation logic 27 in conjunction with the modulator 28 and current control loop 29 produces the bottom switching signals $Q_4$, $Q_5$ and $Q_6$. The logically high portions of these signals define when a corresponding switch in the three phase bridge driver 30 is "on" so as to allow drive voltage to be appropriately applied to a particular phase winding in the brushless direct current motor 10.

It is to be appreciated that a particular embodiment of the invention has been described. Alterations, modifications, and improvements thereto will readily occur to those skilled in the art. Such alterations, modifications and improvements are intended to be part of this disclosure even though not expressly stated herein and are intended to be within the scope of the invention. Accordingly the foregoing description is by way of example only. The invention is limited only as defined in the following claims and the equivalents thereto.

What is claimed is:

1. A drive system for a brushless direct current motor having a plurality of phase windings which are energized by the timed application of drive voltages producing drive currents and back electromotive force voltage conditions in the respective windings, said drive system comprising:

a plurality of circuits for defining differences between back electromotive force voltage conditions present on two successive phase windings of the brushless direct current motor, each circuit including a pair of resistance and capacitance configurations, each resistance and capacitance configuration adjusting a drive voltage of one the successive phase windings and a differential amplifier downstream of the resistance capacitance configurations for defining the difference in adjusted voltages from the respective resistance capacitance configurations;

a plurality of circuits for sensing the drive currents being applied to the respective phase windings of the brushless direct current motor, each current sensing circuit defining a current source for particular resistance and capacitance configurations in the circuits for defining differences between back electromotive force voltage conditions present on two successive phase windings wherein each particular resistance capacitance configuration experiences current source effect corresponding to the drive current in the phase winding to which the drive voltage is to be adjusted;

a plurality of comparator circuits, each associated with a respective differential amplifier in one of the circuits for defining differences between back electromotive force voltage conditions present on two successive phase windings, wherein each comparator circuit is operative to detect zero voltage levels in the output signals from the respective differential amplifier; and circuitry responsive to the detected zero voltage levels for defining switching signals that control the application of drive voltages to the respective phase windings of the brushless direct current motor.

2. The drive system of claim 1 wherein said plurality of comparator circuits each comprise:

a comparative amplifier having a first input for receiving a signal from a differential amplifier in one of the circuits for defining differences in back electromotive force conditions present on two successive phase windings and having a second input for receiving a selectively fedback output signal from the comparative amplifier, the selectively fedback signal being zero volts immediately prior to the signal being received at the first input crossing a zero voltage level.

3. The drive system of claim 2 wherein said plurality of comparator circuits each further comprise:

switching logic associated with the feedback loop of each comparative amplifier for selectively activating the feedback loop of each comparative amplifier whereby the output signal voltage from the comparative amplifier is selectively fedback to the second input of the comparative amplifier.

4. The drive system of claim 3 wherein said switching logic associated with the feedback loop of each amplifier comprises:

gating logic for generating window pulses to the feedback loop, the window pulses having trailing edges which occur immediately after zero crossover of the signal from the differential amplifier in one of the circuits for defining differences between back electromotive force voltage conditions present on two successive windings whereby the feedback loop of the comparative amplifier is disabled during the window period defined by the window pulse and again enabled following receipt of the trailing edge.

5. The drive system of claim 4 wherein the feedback loop of the comparative amplifier comprises:

switches, responsive to the window pulses for disconnecting the fedback output signal from the comparative amplifier during the duration of each window pulse.

6. The drive system of claim 2 wherein the feedback loop of each comparative amplifier includes a switching means for selectively connecting and disconnecting the output of the comparative amplifier from the second input of the comparative amplifier.

7. The drive system of claim 6 further comprising:

gating logic for generating window pulses to the switch in the feedback loop of each comparative amplifier, the window pulses causing the switch to open during the duration of the window pulse wherein the window pulses have trailing edges occurring immediately after the zero voltage crossovers of the respective signal from the differential amplifier that is applied to the first input of the comparative amplifier.

8. The drive system of claim 1 wherein the resistance capacitance configurations in each circuit defining differences between back electromotive force voltage conditions on two successive windings each have resistance values and capacitance values that are a function of the inductance and resistance values of a phase winding in the brushless direct current motor.

9. The drive system of claim 1 further comprising:

a high frequency power supply source for defining the voltage levels and drive currents to the respective phase windings; and a filter connected to the output of each differential amplifier for filtering the output signal of each differential amplifier.

10. The drive system of claim 1 wherein the defined current source for each circuit sensing a drive current being applied to a respective winding produces a specific ratio of amplitude of current to the voltage to be experienced by the resistance and capacitance configurations.

11. The drive system of claim 10 wherein the resistance capacitance configurations in each circuit for defining differences between back electromotive force voltage conditions present on two successive windings have resistance values and capacitance values that are a function of the inductance and resistance values of a phase winding in the brushless direct current motor as well as the specific ratio of drive current amplitude to voltage to be experienced by the resistance and capacitance configuration.

12. A drive system for a sensorless brushless direct current motor having a plurality of phase windings which are energized by the timed application of voltages causing phase currents to flow in the respective windings, said system comprising:

a plurality of voltage sensors for sensing the drive voltages present on two successive phase windings of the brushless direct current motor;

a plurality of current sensors for sensing the respective drive currents for each phase winding of the brushless direct current motor;

a plurality of circuits, responsive to the sensing of drive voltages present on two successive phase windings and the sensed drive currents of the phase windings for defining phase to phase back electromotive force voltage signals between successive windings;

zero cross over comparator circuitry for detecting zero crossover points of the phase to phase back electromotive force voltage signals; and switch signal generators for generating the switching signals which switch the power supply on and off to the respective phase windings, the switching signals having logic level changes at the zero crossover points of the phase to phase back electromotive force voltage signals.

13. The drive system of claim 12 wherein said plurality of circuits for defining phase to phase back electromotive force voltage signals each comprises:

circuitry, responsive to the sensed drive currents in two successive phase windings, for adjusting the sensed voltages of the same two successive phase windings; and a differential amplifier for generating a signal reflecting the difference between the adjusted sensed voltages of the two successive phase windings.

14. The system of claim 13 wherein said zero cross over comparator circuitry for detecting zero crossover points of the phase to phase back electromotive force voltage signals comprises:

a plurality of comparative amplifiers, each having a first input for receiving a signal from a differential amplifier in one of said circuits for defining phase to phase back electromotive force voltage signals and having a second input for receiving a selectively fedback signal from the comparative amplifier, the selectively fedback signal being zero volts immediately prior to the signal being received at the first input crossing a zero voltage level.

* * * * *